United States Patent
Abdirashid et al.

(10) Patent No.: US 10,044,685 B2
(45) Date of Patent: *Aug. 7, 2018

(54) SECURING ENTERPRISE DATA ON MOBILE DEVICES

(71) Applicant: INTERNATIONAL BUSINESS MACHINES CORPORATION, Armonk, NY (US)

(72) Inventors: Mohammad Abdirashid, Highland, NY (US); Frank J. Degilio, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 15/065,910

(22) Filed: Mar. 10, 2016

(65) Prior Publication Data

US 2017/0156058 A1 Jun. 1, 2017

Related U.S. Application Data

(63) Continuation of application No. 14/953,350, filed on Nov. 29, 2015.

(51) Int. Cl.
*H04L 29/06* (2006.01)
*H04W 12/02* (2009.01)
(Continued)

(52) U.S. Cl.
CPC ......... *H04L 63/0428* (2013.01); *H04W 12/02* (2013.01); *H04L 9/0816* (2013.01); *H04L 63/0272* (2013.01); *H04L 67/2842* (2013.01)

(58) Field of Classification Search
CPC ............. H04L 63/0428; H04L 63/0272; H04L 9/0816; H04L 67/2842
See application file for complete search history.

(56) References Cited

U.S. PATENT DOCUMENTS 8,412,955 B1 * 4/2013 Gupta ................... G06F 21/335
713/189
8,433,895 B1 * 4/2013 Sobel .................. H04L 63/0442
380/282

(Continued)

OTHER PUBLICATIONS

List of IBM Patents or Patent Applications Treated as Related (Appendix P); Date Filed: Mar. 14, 2016; 2 pages.

(Continued)

*Primary Examiner* — Beemnet Dada
*Assistant Examiner* — Stephen Gundry
(74) *Attorney, Agent, or Firm* — Cantor Colburn LLP; William A. Kinnaman, Jr.

(57) ABSTRACT

Embodiments include method, systems and computer program products for securing enterprise data in a mobile computing environment. Aspects include receiving, by an application disposed on a mobile computing device, a request to access the enterprise data stored on the mobile computing device in an encrypted format and determining whether the mobile computing device is in communication with an enterprise network. Based on determining that the mobile computing device is in communication with the enterprise network, aspects include transmitting a decryption request to an encryption application disposed on the enterprise network, receiving the enterprise data in an unencrypted format from the enterprise network and granting access to the enterprise data in an unencrypted format to the application. Based on a determination that the mobile computing device is not communication with the enterprise network, aspects also include denying the request to access the enterprise data.

5 Claims, 5 Drawing Sheets

(51) Int. Cl.
*H04L 29/08* (2006.01)
*H04L 9/08* (2006.01)

(56) References Cited

U.S. PATENT DOCUMENTS

| | | | |
|---|---|---|---|
| 9,098,687 B2* | 8/2015 | Hayton | G06F 21/31 |
| 9,232,078 B1* | 1/2016 | Schentrup | H04M 15/58 |
| 9,411,966 B1* | 8/2016 | Smith | H04L 63/0272 |
| 9,413,730 B1* | 8/2016 | Narayan | H04L 63/0471 |
| 9,628,448 B2* | 4/2017 | Hayton | G06F 21/31 |
| 9,665,576 B2* | 5/2017 | Kapoor | G06F 17/3007 |
| 9,680,805 B1* | 6/2017 | Rodgers | H04L 63/061 |
| 9,710,659 B2* | 7/2017 | Ackerly | G06F 21/602 |
| 9,742,747 B2* | 8/2017 | Manges | H04L 63/061 |
| 2007/0057048 A1* | 3/2007 | Plotkin | G06F 21/62 235/382 |
| 2008/0046714 A1* | 2/2008 | Suganthi | H04L 63/0428 713/150 |
| 2010/0239077 A1* | 9/2010 | Michaelis | H04L 63/029 379/93.02 |
| 2010/0250939 A1* | 9/2010 | Adams | G06F 11/1458 713/171 |
| 2011/0264907 A1* | 10/2011 | Betz | H04L 63/0428 713/153 |
| 2011/0314270 A1* | 12/2011 | Lifliand | H04L 63/0428 713/151 |
| 2012/0297206 A1* | 11/2012 | Nord | G06F 21/602 713/193 |
| 2013/0067243 A1* | 3/2013 | Tamayo-Rios | G06F 21/44 713/193 |
| 2013/0091351 A1* | 4/2013 | Manges | H04L 9/14 713/153 |
| 2013/0227279 A1* | 8/2013 | Quinlan | H04L 63/0428 713/165 |
| 2014/0007222 A1* | 1/2014 | Qureshi | G06F 21/10 726/16 |
| 2014/0047516 A1* | 2/2014 | Deshpande | H04W 12/06 726/5 |
| 2014/0189777 A1* | 7/2014 | Viswanathan | H04L 63/105 726/1 |
| 2015/0058629 A1* | 2/2015 | Yarvis | H04L 63/061 713/171 |
| 2015/0278245 A1* | 10/2015 | Sagar | G06F 17/30174 707/610 |
| 2015/0295941 A1* | 10/2015 | Lim | H04L 9/0822 713/165 |
| 2015/0319144 A1* | 11/2015 | Barton | H04L 63/0428 713/168 |
| 2015/0373023 A1* | 12/2015 | Walker | H04L 63/10 726/3 |
| 2016/0063258 A1* | 3/2016 | Ackerly | G06F 21/602 713/189 |
| 2016/0308841 A1* | 10/2016 | Singhvi | H04L 63/0281 |
| 2016/0321464 A1* | 11/2016 | Tamayo-Rios | G06F 21/44 |
| 2016/0323112 A1* | 11/2016 | Chung | H04L 63/083 |
| 2016/0335447 A1* | 11/2016 | Guo | G06F 21/6218 |
| 2017/0185801 A1* | 6/2017 | Dutta | G06F 21/6245 |
| 2017/0222988 A1* | 8/2017 | Prakash | H04L 63/0428 |
| 2017/0230437 A1* | 8/2017 | Kumar | H04L 65/4084 |

OTHER PUBLICATIONS

U.S. Appl. No. 14/953,350, filed Nov. 29, 2015; Entitled: "Securing Enterprise Data on Mobile Devices".
U.S. Appl. No. 14/953,351, filed Nov. 29, 2015; Entitled: "Securing Enterprise Data on Mobile Devices".
U.S. Appl. No. 15/065,909, filed Mar. 10, 2016; Entitled: "Securing Enterprise Data on Mobile Devices".

* cited by examiner

SECURING ENTERPRISE DATA ON MOBILE DEVICES

DOMESTIC PRIORITY

This application is a continuation of the legally related U.S. application Ser. No. 14/953,350 filed Nov. 29, 2015, which is fully incorporated herein by reference.

BACKGROUND

The present disclosure relates to data security, and more specifically, to methods, systems and computer program products for securing enterprise data on mobile devices.

With the advent of mobile computing, many businesses are struggling with securing data on mobile computing devices (smart phones, tablets, etc.) that employees use to access sensitive data in their enterprise network. In general, employees want to be able to use their own mobile computing devices at work and businesses would like to encourage the productivity enhancements that bring your own device can bring to the enterprise.

In addition, many businesses have developed applications, commonly referred to as apps, to create new ways to engage their workforce. One drawback of such applications is that they are commonly configured to store enterprise data on the mobile computing device. As a result, an enterprise's information can end up being stored on a mobile computing device that the enterprise does not own and therefore do not have control over. In many cases, people who use their own mobile computing devices often allow others to use the device outside of the work environment. As a result, enterprise data can be exposed by users of the mobile computing device who might not consider the ramifications of exposing enterprise data on external sites.

Enterprises need to know that when the mobile computing device is not being used for business, any enterprise data on the mobile computing device is secured. Currently, many enterprises use encryption/decryption tools that are installed on the mobile computing device to encrypt and decrypt enterprise data. However, because the encryption/decryption tools are disposed on the mobile computing device, there remains a risk of exposure of the enterprise data as a user can unintentionally decrypt data and make it available.

SUMMARY

In accordance with an embodiment, a computer-implemented method for securing enterprise data in a mobile computing environment is provided. The method includes receiving, by an application disposed on a mobile computing device, a request to access the enterprise data stored on the mobile computing device in an encrypted format and determining whether the mobile computing device is in communication with an enterprise network. Based on determining that the mobile computing device is in communication with the enterprise network, the method also includes transmitting a decryption request to an encryption application disposed on the enterprise network, receiving the enterprise data in an unencrypted format from the enterprise network and granting access to the enterprise data in an unencrypted format to the application. Based on a determination that the mobile computing device is not communication with the enterprise network, the method includes denying the request to access the enterprise data.

In accordance with another embodiment, a mobile computing device for securely accessing enterprise data in a mobile computing environment includes a processor in communication with one or more types of memory. The processor is configured to receive a request to access the enterprise data stored on the mobile computing device in an encrypted format and determine whether the mobile computing device is in communication with an enterprise network. Based on determining that the mobile computing device is in communication with the enterprise network, the processor is also configured to transmit a decryption request to an encryption application disposed on the enterprise network, receive the enterprise data in an unencrypted format from the enterprise network and grant access to the enterprise data in an unencrypted format to the application. Based on a determination that the mobile computing device is not communication with the enterprise network, the processor is further configured to deny the request to access the enterprise data.

In accordance with a further embodiment, a computer program product for securing enterprise data in a mobile computing environment includes a non-transitory storage medium readable by a processing circuit and storing instructions for execution by the processing circuit for performing a method. The method includes receiving, by an application disposed on a mobile computing device, a request to access the enterprise data stored on the mobile computing device in an encrypted format and determining whether the mobile computing device is in communication with an enterprise network. Based on determining that the mobile computing device is in communication with the enterprise network, the method also includes transmitting a decryption request to an encryption application disposed on the enterprise network, receiving the enterprise data in an unencrypted format from the enterprise network and granting access to the enterprise data in an unencrypted format to the application. Based on a determination that the mobile computing device is not communication with the enterprise network, the method includes denying the request to access the enterprise data.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for securing enterprise data in a mobile computing environment are provided. In exemplary embodiments, securing enterprise data in a mobile computing environment includes operating an encryption/decryption application on an enterprise network that is accessible by a mobile computing device. The encryption/decryption application is configured to receive encryption/decryption access requests for enterprise data from mobile computing devices in communication with the enterprise network. The mobile computing device includes a local application that uses the enterprise encryption/decryption application of the enterprise network to encrypt/decrypt the enterprise data that is stored on the mobile computing device.

In exemplary embodiments, the encryption/decryption application includes both the algorithms and keys for encrypting/decrypting enterprise data. Since, neither the algorithms nor keys for encrypting/decrypting enterprise data are stored on the mobile computing device, the mobile computing device is not capable of encrypting or decrypt the enterprise data without communicating with the enterprise network. When the application on the mobile computing device wants to access the enterprise data it must call the encryption/decryption application on the enterprise network to encrypt/decrypt the enterprise data.

In exemplary embodiments, the application on the mobile computing device is configured to only be able use locally stored enterprise data when it is in communication with the enterprise network. In exemplary embodiments, the ability of the application on the mobile computing device to access enterprise data can be further limited based on the manner of connection to the enterprise network. For example, a mobile computing device that is connected to the enterprise network through a public communication network, such as a public Wi-Fi hotspot, a cellular network, a home internet connection or the like, may not be permitted to access enterprise data. However, a mobile computing device that is connected to the enterprise network through a private communication network, such as a secure enterprise Wi-Fi network, may be permitted to access enterprise data. This would be useful for hospitals, banks or retail organizations in which employees may use their personal mobile computing devices for accessing data of patients or customers. If the mobile computing device is stolen or removed from the company any data on the device will be secured.

Figure 1:
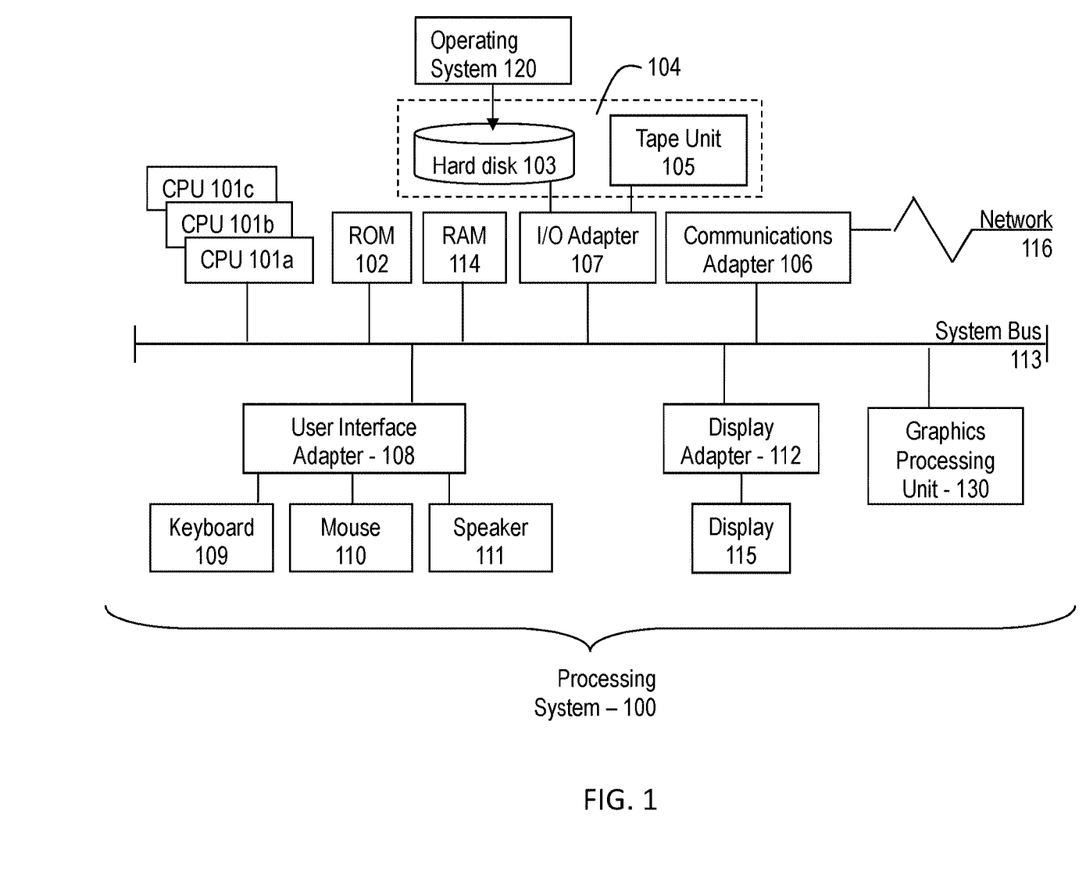
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
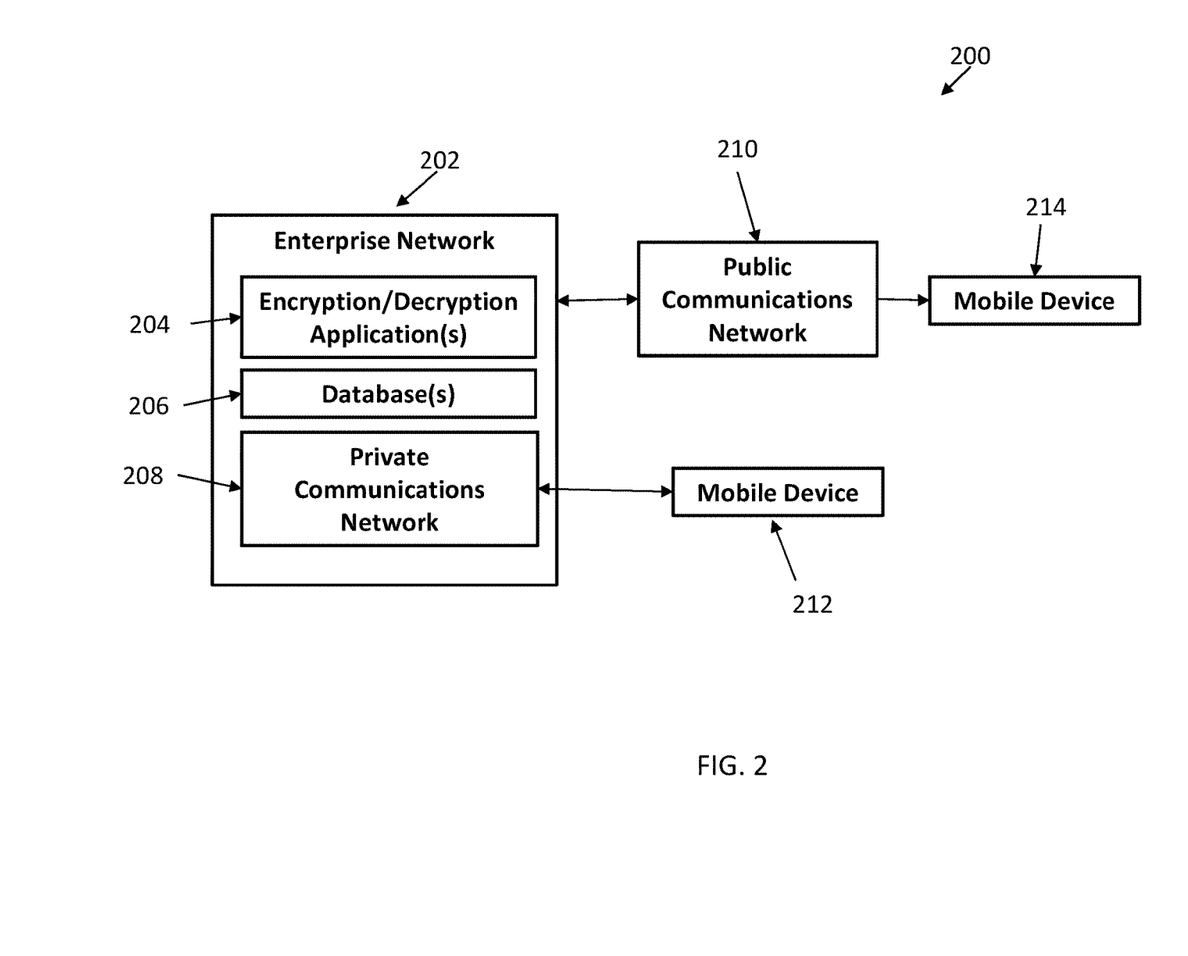
FIG. 2 is a block diagram illustrating a mobile computing environment in accordance with an exemplary embodiment.

Referring now to FIG. 2, a mobile computing environment 200 in accordance with an exemplary embodiment is illustrated. As illustrated, the mobile computing environment 200 includes an enterprise network 202 which includes an encryption/decryption application 204, a database 206 and a private communications network 208. The mobile computing environment 200 also includes a public communications network 210 and one or more mobile computing devices 212, 214. In exemplary embodiments, the mobile computing devices 212, 214 can be smartphones, tablets or the like that are owned by an individual. The public communications network 210 may include one or more of a public Wi-Fi hotspot, a cellular network, a home internet connection or the like, may not be permitted to access enterprise data. The private communications network 208 may be a secure enterprise Wi-Fi network.

In exemplary embodiments, the enterprise network 202 may include a processing system similar to the one described above with reference to FIG. 1. The enterprise network 202 includes a database 206 that is configured to store enterprise data and encryption/decryption keys. The enterprise network 202 also includes encryption/decryption applications 204 that are configured to encrypt and decrypt enterprise data that is provided to mobile computing devices 212, 214. In exemplary embodiments, the mobile computing devices 212, 214 are configured such that they can only store enterprise data in an encrypted format. In exemplary embodiments, when an application on the mobile computing device 212, 214 receives a request to access encrypted enterprise data stored on the mobile computing device 212, 214, the mobile computing device 212, 214 must transmit a decryption request to the enterprise network that includes the stored encrypted enterprise data. Likewise, when a mobile computing device 212, 214 receives a request to store enterprise data that has been updated by mobile computing device, the mobile computing device 212, 214 must transmit an encryption request to the enterprise network that includes the updated enterprise data in a decrypted format.

Figure 3:
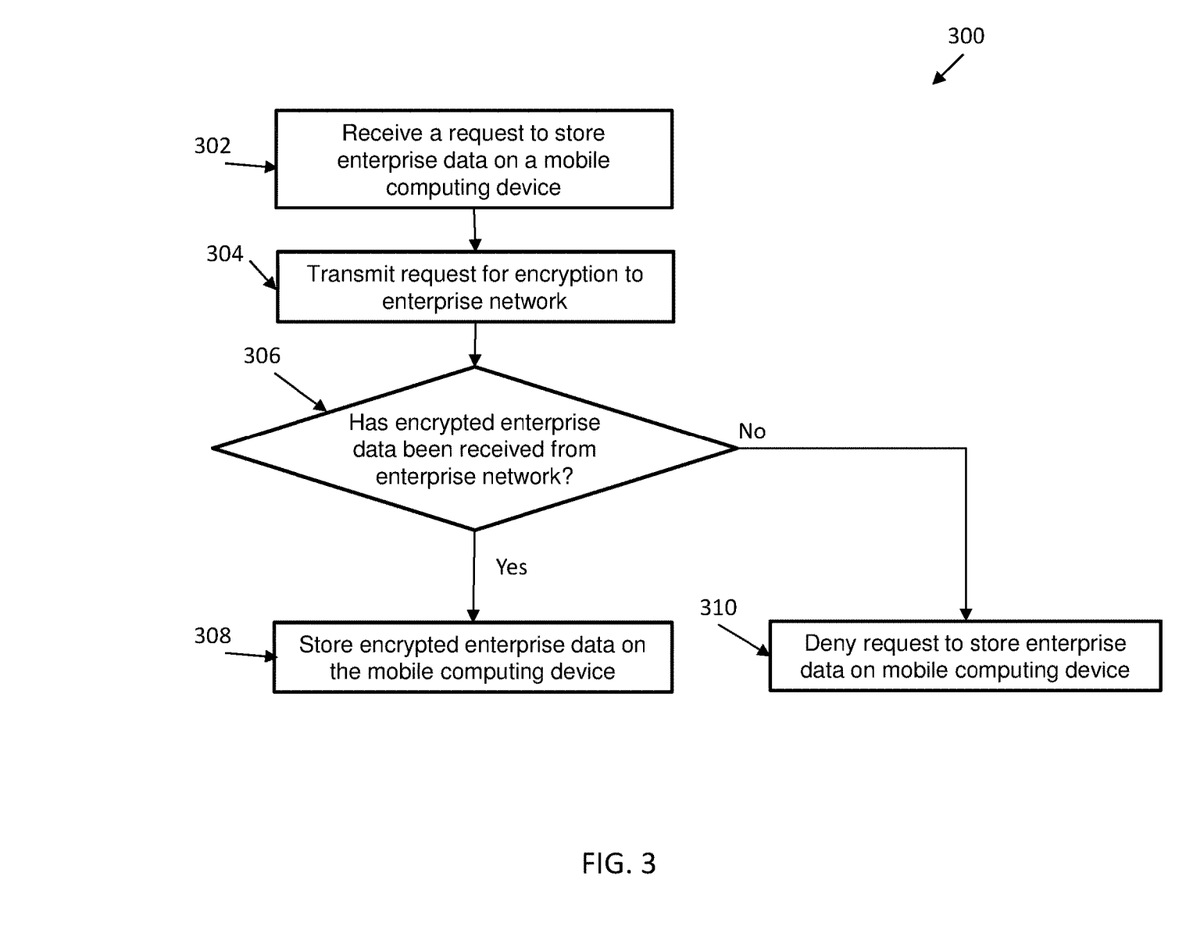
FIG. 3 is a flow diagram of a method for storing encrypted data by a mobile computing device in accordance with an exemplary embodiment.

Referring now to FIG. 3, a flow diagram of a method 300 for storing encrypted data by a mobile computing device in accordance with an exemplary embodiment is shown. As shown at block 302, the method 300 includes receiving a request to store enterprise data on a mobile computing device by an application on the mobile computing device. The method 300 also includes transmitting a request for the encryption of the enterprise data to an enterprise network, as shown at block 304. In exemplary embodiments, the application may utilize one or more known security protocols to ensure that the user of the device is permitted to access the requested data prior to transmitting the request.

In exemplary embodiments, the encryption/decryption application will receive unencrypted enterprise data transmitted to it from the mobile computing device and will return the enterprise data in an encrypted format. As shown at decision block 306, the mobile computing device will determine if it has received the enterprise data in an encrypted format from the enterprise network. If the encrypted data has been received, the method 300 includes storing the enterprise data in an encrypted format on the mobile computing device, as shown in 308. Otherwise, the method 300 proceeds to block 310, and denies the request to store the enterprise data on the mobile computing device.

Figure 4:
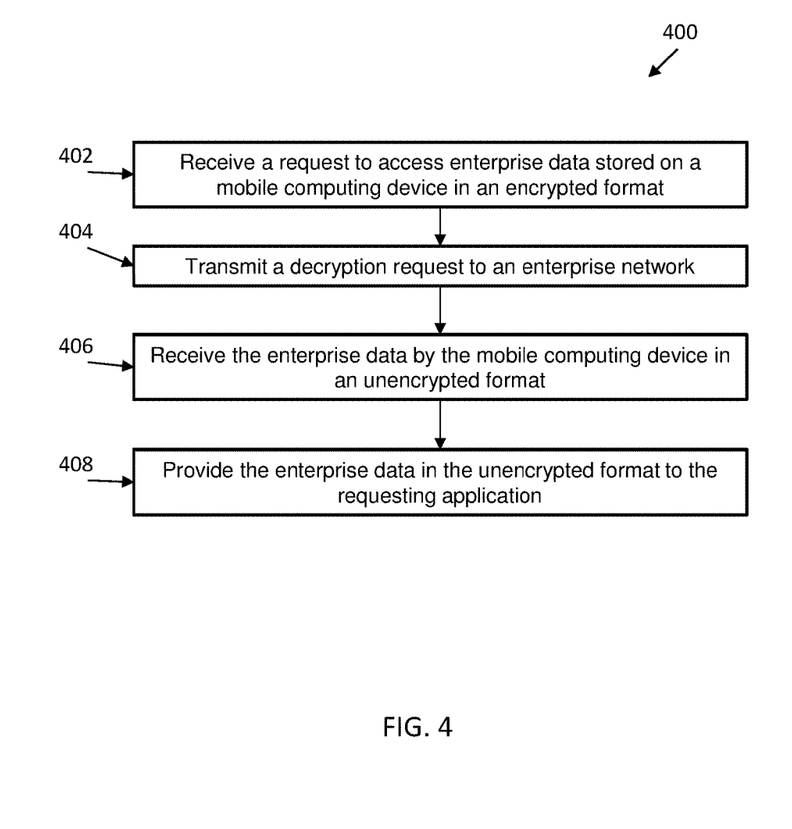
FIG. 4 is a flow diagram of a method for accessing encrypted data by a mobile computing device in accordance with an exemplary embodiment.

Referring now to FIG. 4, a flow diagram of a method 400 for accessing enterprise data in an encrypted format by a mobile computing device in accordance with an exemplary embodiment is shown. As shown at block 402, the method 400 includes receiving a request to access enterprise data on a mobile computing device. Next, as shown at block 404, the method 400 includes transmitting a request for decryption of the enterprise data to enterprise network. In exemplary embodiments, transmitting the request for encryption of the enterprise data to enterprise network includes transmitting the enterprise data in an encrypted format. The method 400 also includes receiving the enterprise data by the mobile computing device in an unencrypted format, as shown at block 406. Next, as shown at block 408, the method 400 includes providing the enterprise data in the unencrypted format to the requesting application.

In exemplary embodiments, the request to encrypt or decrypt the enterprise data that is transmitted to the enterprise network may be configured such that it can only be successfully transmitted to the encryption/decryption application when the mobile computing device is connected to the enterprise network via a private communications network. In exemplary embodiments, a security protocol of the private communication network of the enterprise network can be leveraged to ensure the security of the transmission of unencrypted enterprise data. In addition, the mobile computing device is configured to use known security protocols that require identification material associated either with the user, the application, both or some other criteria for identifying which encryption/decryption key or keys to employ.

Figure 5:
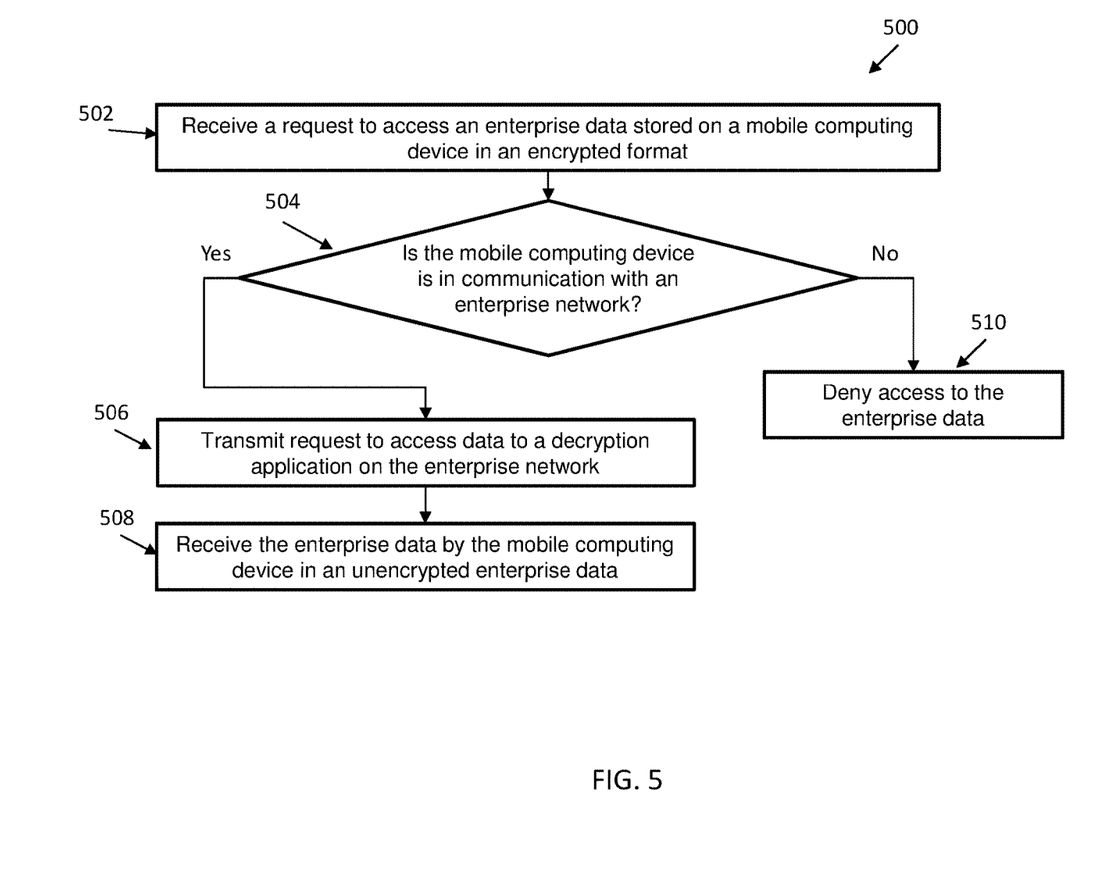
FIG. 5 is a flow diagram of a method for securing enterprise data in a mobile computing environment in accordance with an exemplary embodiment.

Referring now to FIG. 5, a flow diagram of a method 500 for securing enterprise data in a mobile computing environment in accordance with an exemplary embodiment is shown. As shown at block 502, the method 500 includes receiving a request to access an enterprise data stored on a mobile computing device in an encrypted format. Next, as shown at decision block 504, the method 500 includes determining if the mobile computing device is in communication with an enterprise network. If the mobile computing device is not communication with an enterprise network, the method 500 proceeds to block 510 and denies access the enterprise data. If the mobile computing device is in communication with an enterprise network, the method 500 proceeds to block 506 and transmits a request to decrypt the enterprise data to a decryption application on the enterprise network. Next, as shown at block 508, the method 500 includes receiving the enterprise data by the mobile computing device in an unencrypted format.

In exemplary embodiments, since the enterprise data is encrypted using encryption services that do not reside on the mobile computing device, there is no way to decrypt the enterprise data on the mobile computing device when it is not connected to the enterprise network. In exemplary embodiments, both the encryption and decryption processes require a network connection to be used. Thus the storing of the enterprise data on the mobile communication device cannot occur if the enterprise network is unavailable. Similarly the encrypted enterprise data stored on the mobile computing device is useless without being connected to the enterprise network. This configuration ensures that the enterprise data on the device is secure when the mobile computing device is accessed when it is not in communication with the enterprise network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for securing enterprise data in a mobile computing environment, the method comprising:
    receiving, by an application disposed on a mobile computing device, a request to access the enterprise data stored on the mobile computing device in an encrypted format;
    determining whether the mobile computing device is in communication with an enterprise network, wherein the determination that the mobile computing device is in communication with the enterprise network requires that the mobile computing device to be in communication with the enterprise network via a secure enterprise W-Fi network;
    based on determining that the mobile computing device is in communication with the enterprise network:
        transmitting a decryption request to an encryption application disposed on the enterprise network, wherein transmitting the decryption request to the encryption application disposed on the enterprise network includes transmitting the enterprise data in the encrypted format;
        receiving the enterprise data in an unencrypted format from the enterprise network; and
        granting access to the enterprise data in an unencrypted format to the application disposed on the mobile computing device;
    based on a determination that the mobile computing device is not communication with the enterprise network, denying the request to access the enterprise data.

2. The computer-implemented method of claim 1, wherein an encryption key utilized by the encryption application is only stored on the enterprise network.

3. The computer-implemented method of claim 1, wherein the determination that the mobile computing device is in communication with the enterprise network comprises determining a type of a communications network the mobile computing device is connected to.

4. The computer-implemented method of claim 3, wherein the type of the communications network includes a public communications network and a private communications network.

5. The computer-implemented method of claim 1, further comprising:
    updating the enterprise data in a decrypted format by the application to create an updated enterprise data;

receiving, by the application disposed on the mobile computing device, a request to store the updated enterprise data in the encrypted format;

based on determining that the mobile computing device is in communication with the enterprise network:
  transmitting an encryption request to the encryption application disposed on the enterprise network;
  receiving the updated enterprise data in the encrypted format from the enterprise network; and
  storing the updated enterprise data in the encrypted format on the mobile computing device.

* * * * *

UNITED STATES PATENT AND TRADEMARK OFFICE
CERTIFICATE OF CORRECTION

PATENT NO. : 10,044,685 B2  
APPLICATION NO. : 15/065910  
DATED : July 24, 2018  
INVENTOR(S) : Abdirashid et al.

Page 1 of 1

It is certified that error appears in the above-identified patent and that said Letters Patent is hereby corrected as shown below:

On the Title Page

Item [72], should read:  
Mohammad Abdirashid, Highland, NY (US)  
Frank J. De Gilio, Poughkeepsie, NY (US)

Signed and Sealed this  
Fifth Day of May, 2020

Andrei Iancu  
*Director of the United States Patent and Trademark Office*